Nov. 1, 1966     O. TORIGIANI     3,283,333
PRECISION MAPPING MACHINE
Filed May 4, 1964     2 Sheets-Sheet 1
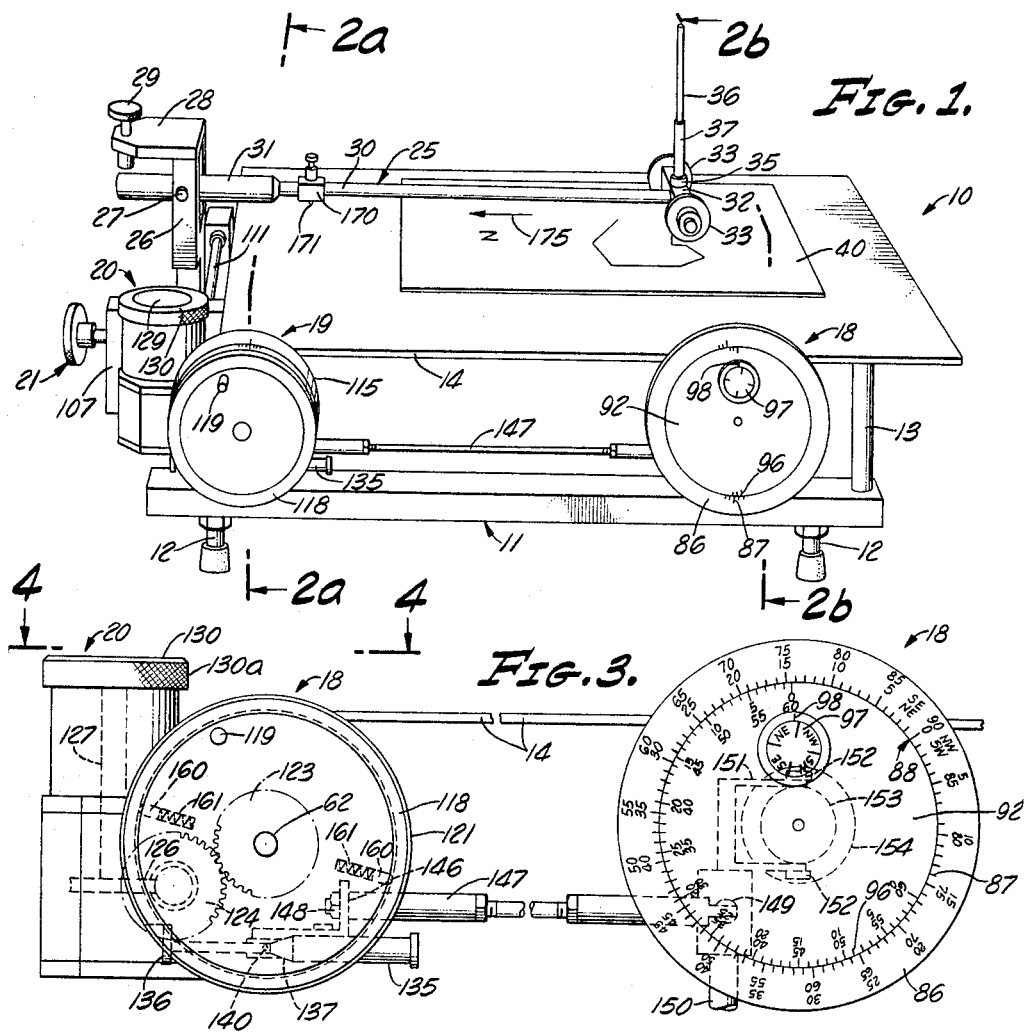
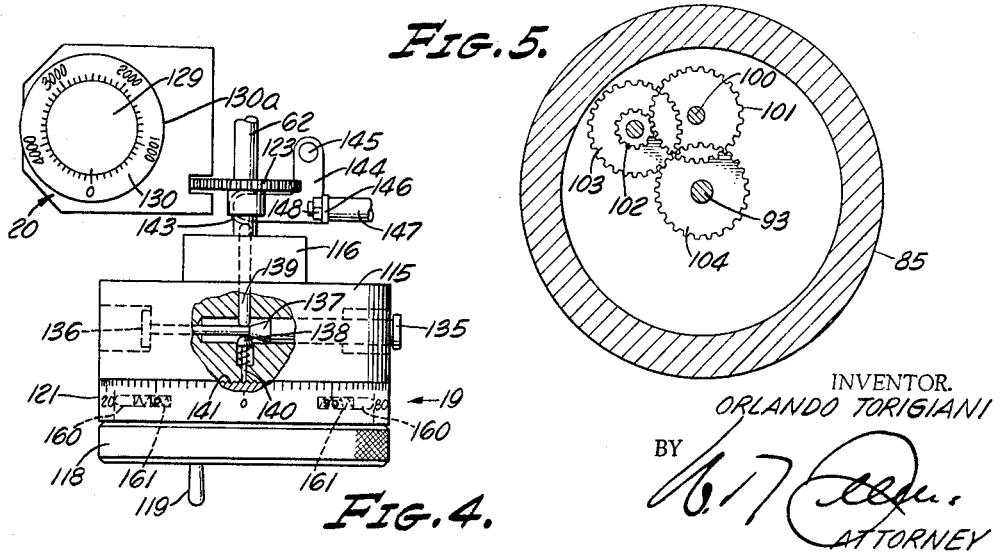
INVENTOR.
ORLANDO TORIGIANI
BY 
ATTORNEY Nov. 1, 1966   O. TORIGIANI   3,283,333
PRECISION MAPPING MACHINE
Filed May 4, 1964   2 Sheets-Sheet 2
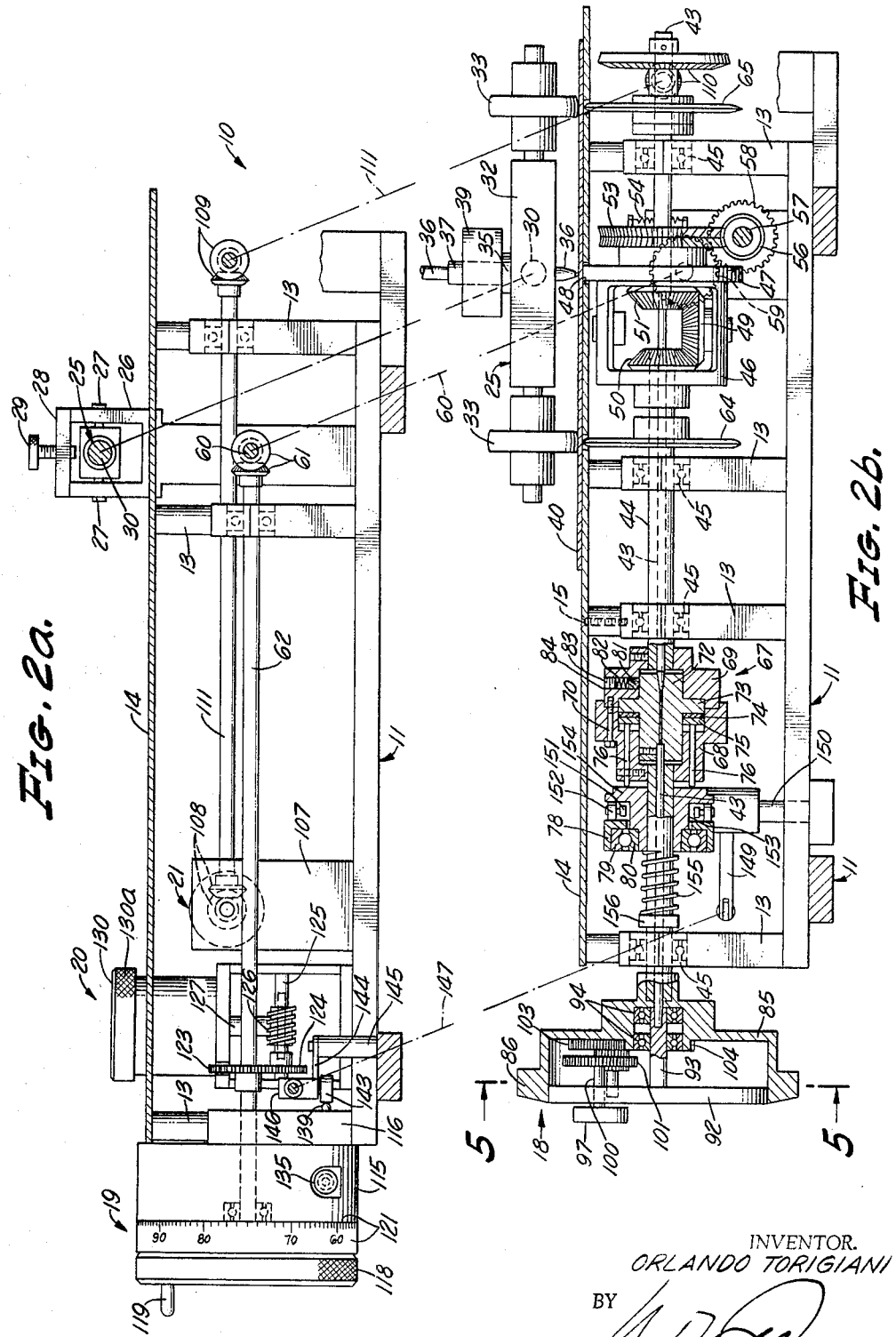
INVENTOR.
ORLANDO TORIGIANI
BY
ATTORNEY United States Patent Office 3,283,333
Patented Nov. 1, 1966

3,283,333
PRECISION MAPPING MACHINE
Orlando Torigiani, 301 Truxton Ave., Bakersfield, Calif.
Filed May 4, 1964, Ser. No. 364,555
16 Claims. (Cl. 346—8)

This invention relates to mapping machines and more particularly to a compact, precision machine for drawing straight lines precisely to scale and accurately related to one another as respects their respective bearings. The machine is particularly suitable for use in mapping plots from survey data with such preciseness as to provide a check on the accuracy of the survey data by checking to determine whether the points of beginning and termination coincide.

The invention machine is completely self-contained and operates to draw a scale map, plot or other representation of terrain on ordinary, reasonably firm paper or sheet material. Desirably, the machine includes a broad area support for the sheet material free of obstructions interfering with the rotation or movement of the paper in any planar direction on this support. The sheet material is snugly clamped between two pairs of cooperating rollers including a pair of driving rollers and a cooperating pair of backup rollers located on the opposite sides of the sheet. The former are interconnected by differential drive means whereas the latter rollers are mounted on a weighted arm having a combination universal and fulcrum connection with the machine frame. When the driven rollers are operating differentially, they are effective to rotate the sheet about the axis of the marking stylus to any selected bearing; whereas when they are locked together they are effective to advance the sheet material in a straight line normal to their axis of rotation.

The machine includes precision vernier scale means for rotating the differential drive wheels to any bearing with an accuracy of one minute of arc.

A second set of manually settable precision scales connected to the differentially drive wheels cooperate in measuring the length of any straight line drawn on the map. These scales include a fine scale for measuring distances to a tenth of a foot and a gross scale for counting multiples of the fine scale.

Another feature is the provision of means for locking and unlocking the differential drive for the map orienting mechanism and for simultaneously performing the reverse operation with respect to the distance measuring scales to the end that when the differential drive is locked out the distance scales are free for adjustment and vice versa.

The machine also includes interdependent clutch means associated with the differential drive and with the distance measuring scales operating 180 degrees out of phase with one another to the end that either the distance scales or the differential drive means are locked out of operation when the other is free for rotation. This safeguards against the possibility of moving the map when the machine is being adjusted or between actual use of the machine to rotate or move the map to a straight line.

Another feature of the machine is the use of anti-backlash gearing in combination with worm and worm gear drives to avoid any possibility of error arising through looseness or play between mating teeth of all drive components.

The marking stylus or other means for pressing the outline of the map on the sheet material is positioned midway between the paper gripping means and any movement of the map must take place either about the axis of the stylus or transversely in a straight line past the stylus.

Still another feature is provision made for reclamping a previously prepared map in the machine accurately centered and oriented in the same position as originally.

The bearing setting scales include simple easily read means for ascertaining the particular quadrant occupied at any particular time thereby permitting the operator to determine at a glance whether the line and bearing then being drawn is in the northeast or northwest quadrant as well as the precise bearing of the line in that quadrant.

Accordingly, it is a primary object of the present invention to provide an improved self-contained, precision mapping machine for use in making scale maps and in checking the accuracy of survey data.

Another object of the invention is the provision of a simple, rugged, inexpensive mapping machine adapted to be used by semiskilled persons and operable by them to produce high accuracy scale maps directly on sheet material.

Another object of the invention is the provision of a mapping machine having two pairs of wheels operable to clamp flexible sheet material therebetween and to move this sheet material in an accurately controlled, precise manner selectively about the axis of a stylus therebetween or in a straight line transversely of the stylus.

Another object of the invention is the provision of a self-contained mapping machine with means for firmly gripping a sheet of flexible material and operable to orient this material about an axis normal thereto as well as to move the paper in a straight line transversely of its axis together with means for reorienting the paper between successive straight line movements of accurately measured lengths.

These and other more specific objects will appear upon reading the following specification and claims and upon considering in connection therewith the attached drawings to which they relate.

Referring now to the drawings in which a preferred embodiment of the invention is illustrated.

FIGURE 1 is a general perspective view of a preferred embodiment of the mapping machine as viewed from the operator control station;

FIGURES 2a and 2b are vertical sectional views taken respectively along the broken lines 2a—2a and 2b—2b on FIGURE 1;

FIGURE 3 is a fragmentary front elevational view on an enlarged scale of the bearing and distance measuring assemblies;

FIGURE 4 is a top plan view of the distance measuring assembly as viewed from line 4—4 on FIGURE 3; and FIGURE 5 is a fragmentary sectional view taken along line 5—5 on FIGURE 2b showing gearing details of the bearing scale assembly.

*The mapping machine generally*

Referring initially to FIGURE 1, there is shown a preferred embodiment of the mapping machine designated generally 10. This machine has a suitable rigid main frame 11 providing a rigid support for the precision operating components. The base may be provided with rubbercapped supporting feet 12 and includes a number of columns 13 supporting a flat surface table top 14 secured in place, as by screws 15 (FIGURE 2b).

Arranged vertically along the front of the machine is a map orienting and bearing setting assembly 18 and distance measuring assemblies 19, 20. a manually manipulatable control wheel 21 projecting from the left-hand end of the machine serves to rotate the map to a new bearing position in a manner which will be explained below.

Another feature best understood from FIGURE 1 is the map-gripping and stylus supporting assembly designated generally 25 having a universal connection at its left-hand end with a rigid upright yoke member 26 anchored to main frame 11. The map-gripping assembly 25 is supported for pivotal movement in a vertical plane about a horizontal axis through pivot pins 27 (FIGURE 2a) supported in the opposite sides of yoke 26. A bracket 28 secured to the top of the yoke supports a thumbscrew 29 adjustable toward and away from the left-hand end of arm 25. Normally, the thumbscrew is adjusted upwardly away from the arm allowing its right-hand end to rest against the map. However, when the map is not in position, arm 25 may be supported in an inclined position above the map by screwing thumbscrew 29 downwardly. It will be understood that map-gripping assembly 25 includes a rod 30 having a snug rotary fit within a well formed in the right-hand end of pivot member 31 to which it is held in any suitable manner permitting relative rotary movement of members 30, 31 while restricting them against relative axial displacement.

The right-hand or free end of arm 30 is formed with a cross-head 32 (FIGURE 2b) and has a pair of aligned precision-ground crowned rollers 33, 33 journaled to its opposite ends. Of importance is the fact that crowned rollers 33 are spaced equidistantly from the longitudinal axis of arm 30.

Cross-head 32 is provided with an upright bushing 35 formed to receive and accurately seat the lower end of a ball point or other suitable stylus 36 held detachably in assembled position by a knurled sleeve 37 threading into bushing 35. Desirably, sleeve 37 bears against the upper end of a spring surrounding the stylus and serves to hold the latter resiliently seated and accurately positioned midway between differential drive wheels for the map to be described presently. A suitable weighting ring 39 of an appropriate size telescopes over sleeve 37 after the map is in position and is effective to hold the map sheet 40 tightly gripped between backup rollers 33, 33 and the upper rim edges of the differential drive assembly now to be described.

Differential drive mechanism for the map

Referring more particularly to FIGURES 2b and 3, the construction and operating details of the differential mechanism forming an important feature of the invention will be described. This mechanism, mounted on concentric shafting extending transversely of one end of the machine, includes an inner shaft 43 rotating interiorly of tubular shafting 44. It will be understood that inner shaft 43 is preferably formed in separate parts rigidly connected together and extending across the width of the machine, as viewed in FIGURE 2. This shaft, together with tubular shafting 44, is rotatably supported in antifriction bearings 45 distributed along its length and mounted in pedestals fixed to main frame 11, it being understood that in some instances bearings 45 do not have direct contact with inner shaft 43 but only with shaft 44.

The differential mechanism includes a hollow housing 46 having a backup wheel 47 at its right-hand end directly underlying stylus 36 and engageable therewith through an opening or slot 48 formed in map-supporting plate 14. The upper periphery of the backup wheel is substantially flush with but above the top surface of plate 14. The gearing within housing 46 includes a gear 49 mating with axially aligned antibacklash bevel gears 50, 51 the former being fixed to the right-hand end of tubular shaft 44 and gear 51 being fixed to inner shaft 43.

Fixed to the right-hand end of differential housing 46 is an antibacklash worm gear 53 formed in two halves and resiliently biased to rotate in opposite directions by a spring 54 having its ends supported on pins projecting from the respective halves of the worm gear as is well known in the gear art, it being understood that one of the gear halves is provided with slots through which the pins carried by the far half project. Worm gear 53 mates with a driving worm 56 fixed to a shaft 57. Fixed to the latter shaft is a gear 58 which meshes with a gear 59 fixed to a shaft 60 extending crosswise of the rear of the machine frame. Shafts 60 and 62, lying at right angles to one another, are coupled together by mating bevel gears 61 one of which is fixed to shaft 60 and one to shaft 62 (FIGURE 2a) which is coupled to distance measuring assembly 19, 20.

An important component of the differential mechanism is a pair of high precision congruent drive rollers 64, 65 one of which is keyed to tubular shaft 44 and the other of which is keyed to inner shaft 43. Each of rollers 64, 65 has a very narrow crowned rim edge engageable with the lower surface of map paper 40 at points directly beneath the high points of the crowned rims of backup rollers 33, 33. As will be recognized, it is important that rollers 64, 65 be equally spaced to either side of a vertical plane passing through the axis of stylus 36 and its point of contact with paper 40.

It will be clear from the foregoing that when congruent rollers 64, 65 rotate in unison and in the same direction they are effective to advance the map sheet past stylus 36 in a straight line parallel to the plane of these rollers. However, when they are allowed to rotate at the same rate in opposite directions, then the paper rotates, either clockwise or counterclockwise, about the stylus axis.

Whether rollers 64, 65 are driven in the same direction or differentially in opposite directions is determined in part by the engaged or disengaged condition of clutch 67 located intermediate the opposite ends of differential shafts 43, 44 (FIGURE 2b). As illustrated, clutch 67 comprises a pair of oppositely facing cup-shaped housings 68, 69 rigidly secured, as by set screws, to the separated ends of tubular shafting 44, the abutting lips of housings 68, 69 being held together by cap screws 70. This housing encloses an internal clutch member 72 having an axial bore seating the adjacent ends of inner shaft 43. As shown, one shaft end is secured to member 72 by a set screw and the other shaft end is tapered and has a forced friction fit with member 72.

Inner clutch member 72 is provided with an annular flange 73 against one side face of which is positioned a clutch shoe 74 of suitable material. This ring may be held pressed against flange 73 by a backup ring 75 supported loosely about the shank of member 72 and having a pair of guide pins 76 projecting axially and loosely through bores formed in the side wall of the clutch housing member 68. The outer ends of pins 76 lie against one face end of clutch actuating collar 154 controlled by the operating yoke 151 and clutch spring 155. Collar 154 has a free sliding fit along shaft 44 and includes an annular groove 153 receiving the roller equipped upper ends of yoke 151. The rollers on this yoke rest loosely between the side walls of groove 153 which is formed in part by a flanged ring 78 in the peripheral rim of which there is firmly mounted the outer race 79 of a ball bearing assembly having an inner race 80 firmly fixed to the hub of collar 154.

The presence of the antifriction bearing 79, 80 permits collar 154 to be pressed to the left, as viewed in FIGURE 2b, against the clutch spring 155 without, however, imposing a drag on shaft 44. When clutch operating yoke 151 is not held to the left, spring 155 is free to press the collar to the right along shaft 44 shifting clutch operating pins 76 to the right to clamp clutch shoe 74 between flange 73 and clutch plate 75 thereby requiring inner and outer shafts 43, 44 to rotate in unison with one another.

When the clutch is not locked in closed position, it is important that shafts 43 and 44 be interconnected by slip clutch means to avoid unintentional movement of either. Such a slip clutch is here shown as mounted in clutch housing member 69 and includes a drag shoe 81 held pressed against the peripheral surface of clutch member 72 by a coil spring 82 and an adjustable retainer screw 83 mounted in a threaded bore 84 of housing member 69. It will be evident from the foregoing that screw 83 can be adjusted to press shoe member 81 against the hub of member 72 with the requisite degree of pressure to prevent unintended relative movement of shafts 43, 44 while main clutch 67 is disengaged.

*Bearing setting assembly*

Bearing setting mechanism 18 includes an outer cup-shaped housing 85 (FIGURE 2b) fixed to the left-hand end of tubular shaft 44 and having a broad rimmed lip 86 provided with a precision scale 87 (FIGURE 3) accurately divided into 90 graduations each representing one degree of arc and readable either clockwise or counterclockwise from a common point indicated at 88.

Rotatably supported immediately inwardly of lip 86 is an inner scale ring 92 having a stem 93 suitably detachably secured to the outer end of the inner shaft 43 of the differential drive mechanism. Desirably, stem 93 is supported in antifriction bearings 94 seated in a well formed in the bottom of a cup-shaped member 85. The rim edge of dial 92 is provided with a vernier scale 96 (FIGURE 3) having 60 graduations extending over 59 graduations of scale 87. The vernier scale is marked with two rows of indicia reading in opposite directions from zero to 60 and useful in a manner to be described to read outer scale 87 to an accuracy of one minute of arc.

Bearing mechanism 18 also includes a quadrant identifying dial 97 (FIGURES 1, 2b) journaled in disc 92 and having as its purpose indicating to the operator the particular quadrant then occupied by the map. The face of this indicator is divided into four 90-degree quadrants each identified by appropriate quadrant identifying initials, as NE, NW, SW and SE. The quadrants so marked cooperate with a reference arrow 98 placed on the face of dial 92 radially opposite one end of vernier scale 96. Accordingly, the position of indicator 98 opposite one of the quadrants indicates to the operator not only the quadrant then occupied by a map in the process of being drawn, but the approximate position within this quadrant.

In order to maintain quadrant indicator 97 in proper position, this indicator is mounted on a shaft 100 journaled in dial 92 and supporting, at its inner end, a gear 101 in mesh with pinion 102 fixed to a large gear 103. This gear meshes with teeth 104 concentrically in the interior bottom of cup-shaped member 85, all as is clearly shown in FIGURE 5. This gearing has a speed reduction factor of 1 to 4 with the result that the quadrant indicator 97 rotates once for each four revolutions of housing 85.

Rotation of bearing mechanism 18 to a desired bearing setting within a particular quadrant along with the map or sheet 40 is accomplished by manipulation of control wheel 21 positioned along the left-hand end of mapping machine 10 (FIGURES 1, 2a). This control wheel and its attached shaft is supported in a bracket 107 rigid with main frame 11 and drives a pair of meshing backlash-free bevel gears 108, 109 and 110 (FIGURES 2a, 2b) interconnected by shafting 111. The driven one of bevel gears 110 is secured to the inner differential drive shaft 43. It will therefore be apparent that if clutch mechanism 67 is declutched, rotation of control knob 21 operates to rotate differential shaft 43 in a given direction to rotate inner dial 92 of bearing mechanism 18 in one direction as the surrounding housing 85 of this bearing scale rotates through an equal arc in the opposite direction. During this operation gear housing 46 for the differential gears 49, 50, 51 is held stationary by the positive locking action of worm 56 and worm gear 53 engaged therewith. Likewise, the map orienting drive rolls 64, 65 will rotate differentially in synchronism with dial 92 and its cooperating housing 85 thereby rotating map 40 about the axis of stylus 36 and through an arc corresponding exactly with the relative arcuate movement of dial 92 and scale 87. During this operation quadrant indicator 97 will also rotate about its axis to inform the user of the particular quadrant then involved in the mapping operation.

*The distance measuring mechanism and its connections with the map orienting mechanism*

Referring now more particularly to FIGURES 1, 3, 4 and 2a, there will be described details of the distance measuring mechanisms 19, 20 and the drive connections thereof with the map positioning rollers 64, 65. As is best shown in FIGURES 3 and 4, the units distance measuring mechanism 19 includes a cylindrical main body member 115 rigidly secured to main frame 11 by a bracket 116. Rotatably supported on the outer end of this main body is a manually driven drum 118 provided with a crank 119. Drum 118 is fixed to a drive shaft 62, bevel gear 61, and shaft 60 drivingly connected to worm 56 (FIGURE 2b) and is encircled by a units distance scale ring 121 having its inner rim divided into 100 graduations each representing one foot or other suitable unit of distance. Ring 121 has a slip clutch driving connection with drum 118 and best shown in FIGURE 3, permitting scale ring 121 to be rotated back to its zero setting while the drum proper is locked against rotation by means to be described presently. This slip clutch comprises a pair of diametrically opposed clutch shoes 160 seated in radial bores of drum 118 and urged into smooth frictional engagement with the inner surface of ring 121 by springs 161. Normally, these slip clutches assure that scale ring 121 rotates with drum 118. However, when this drum is locked against rotation, the knurled outer rim of the scale ring can be grasped to reset this ring on zero.

The described units measuring unit 118, 121 has a drive connection with a "tens" or decade distance scale 20 by backlash-free gearing now to be described. The referred to drive connections between units measuring device 19 and tens units measuring device 20 includes a pair of gears 123, 124 fixed respectively to a shaft 62 and a shaft 125, the latter supporting the worm and worm wheel drive 126 for shaft 127 depending from rotary disc 129. Disc 129 carries a single indicator mark and rotates concentrically within the periphery of stationary tens unit scale 130. It will be understood that the gearing interconnecting the units distance drum 118 and the tens unit indicator 129 are so designed and proportioned that one rotation of drum 118 rotates indicator 129 through a single graduation with the result that ten rotations of drum 118 provides a reading of 1000 feet on scale 130.

It is important that the map orienting scale assembly 18 be locked out of operation when the distance measuring scales 19, 20 are in use and vice versa. These purposes are served, according to the present invention, by means of interlocking clutch mechanism shiftable between two stable positions, in one of which the bearing mechanism is unlocked and the distance measuring scales are locked against rotation, and in the other of which the reverse locking conditions prevail.

Referring to FIGURES 3, 4 and 2a, it will be understood that the locking clutch for distance measuring drum 118 includes a manually operable plunger 135 reciprocably supported in main body 115 and held against disassembly therefrom by a retainer cap screw 136 threaded axially into the end of plunger 135. Frusto-conical portion 137 of plunger 135 operates crosswise of and between the adjacent ends of a spring-pressed detent 138 and a plunger 139. By reason of this arrangement, detent 138 is shiftable axially to a position such that its adjacent end is seated on the large diameter portion of plunger 135 and its outer end 140 seats in one of an annular row of depressions 141 formed in the rear face of distance measuring drum 118 thereby locking the latter against rotation. As shown in FIGURE 4, detent 138 is in retracted position and drum 118 is free to rotate with its supporting shaft 62.

Whenever detent 138 is in locked position, plunger 139 will likewise be shifted in the opposite direction to engage a roller 143 carried by a bell crank 144 pivoted to frame 11 by pivot pin 145. Bell crank 144 has an upturned tang 146 to which the adjustable motion transmitting linkage 147 is connected by nut 148. The right-hand end of linkage 147 as viewed in FIGURE 3 has a pivot pin connection with a bell crank 149 journaled on a vertically disposed shaft 150 (FIGURE 3). Bell crank 149 includes a yoke 151 having horizontally disposed arms supporting rollers 152 on the ends thereof operating in an annular groove 153 of the clutch operating collar 154. This collar is journaled loosely about tubular shafting 43 and is spring-biased by clutch spring 155 to move to the right as viewed in FIGURE 2b. One end of this spring bears against collar 154 and the other bears against collar 156 fixed to shaft 43.

It will be apparent from the foregoing that clutch operating plunger 135 has two stable positions one of which is shown in FIGURE 4, wherein measuring assemblies 19, 20 are declutched and clutch 67 is engaged, and in the other of which the cylindrical thicker portion of the plunger is positioned between detent 138 and plunger 139. In the latter position, crank 119 used to drive the distance measuring assemblies 19, 20 is locked against rotation and clutch 67 is declutched.

Operation

The operation of the described mapping machine to make a map using survey data will be readily understood from the foregoing detailed description of the machine and the relationship of the components to one another. The operator first places a sheet of reasonably stiff paper 40 in the machine by simply pivoting arm 25 upwardly about pivot pins 27. This arm may be supported in this inclined position by the downward adjustment of thumb screw 29 (FIGURE 1). During this operation the weight 39 (FIGURE 2b) may be and preferably is detached and later reassembled over the upper end of stylus 36 and its supporting sleeve 37. Paper 40 having been placed on the table top with its center generally opposite the stylus, arm 25 is lowered until the map is firmly gripped between backup rollers 33 and differential rollers 64, 65. Screw 29 is backed away from the remote end of arm 25 so as not to interfere and weight 39 is assembled over the stylus to hold the map firmly gripped between the rollers and barely in contact with the table top.

At this time and prior to placing the sheet upon table top 14 of the machine, distance measuring rings 121 and 130a of the distance measuring assemblies 19, 20 are set accurately at their zero positions. In this connection, it will be understood that ring 130a of assembly 20 is provided with a friction slip clutch assembly between this ring and the supporting main body and identical, for example, with that provided for ring 121 and comprising components 160, 161. The knurled rims of rings 121 and 130a are grasped and manually returned to their respective zero positions. This operation is performed while the clutch operating plunger 135 is pushed to the left from the position shown in FIGURES 3 and 4 to lock drum 118 and crank 119 against rotation. Under these conditions, the differential gearing clutch 67 is disengaged for reasons described above.

The distance measuring units 19, 20 having been set at zero, the operator next pulls plunger 135 to the left, as viewed in FIGURES 3 and 4, to lock the distance measuring units in zero position, an operation which simultaneously declutches and disengages clutch 67 by shifting linkage 147 and bell crank 149 in a direction to shift clutch operating collar 154 to the left, as viewed in FIGURE 2b. The differential shafts 43, 44 now being free to rotate relative to one another, the operator grasps the bearing setting control hand wheel 21 at the left-hand end of the mapping machine and rotates it until quadrant indicator 97 indicates that the particular quadrant to be mapped is opposite arrow 98 on dial 92 (FIGURE 3). Assuming that the first bearing to be run in NE 14 degrees and 22 minutes, hand wheel 21 is rotated until the zero end of vernier scale 96 having readings running in the same direction as those on the portion of scale 87 designated NE is between readings 14 and 15 of scale 87. The operator then adjusts control 21 until graduation 22 on the vernier scale is exactly opposite a graduation of NE scale 87.

The machine is now in readiness to draw a straight line on map paper 40 along this bearing setting, the precaution first being taken to pull plunger 135 outwardly to engage differential clutch 67 and to release detent 140 which, until then, locked the distance measuring units in zero position.

Crank 119 is then grasped and rotated from its zero position through the required distance, of say 128 feet. Although distance measuring device 19 is not shown with a vernier scale to measure fractions of a foot, it will be understood that such a scale can be and desirably is provided on main body 115 closely beside the scale on ring 121. Since the bearing mechanism and the differential units are now locked against rotation by clutch 67, rotation of crank 119 acts through shaft 62, spur gear 61, shaft 60, gears 58, 59 to rotate worm 56 and worm wheel 53 and both shafts 43, 44 in unison. Accordingly, the precision rollers 64, 65 mounted on shafts 44 and 43, respectively, rotate in unison and in the same direction thereby to advance map 40 in a straight line for the designated distance corresponding to that particular line of the map being drawn.

This having been accomplished, the operator presses clutch operating plunger 135 inwardly to disengage clutch 67 while simultaneously locking the distance measuring units 19 and 20 against movement. The operator then proceeds as described above to set the bearing mechanism on the next bearing along which the next line is to be drawn on the map and, in so doing, rotates the map about the axis of stylus 36 through the exact arc representing the difference between the last run bearing and the next bearing to be run. Before re-engaging clutch 67 by pressing plunger 135 inwardly, the operator returns distance measuring rings 121 and 130a to their zero settings. Once this has been done, plunger 135 is pulled outwardly to disengage the locking clutch for measuring drum 118 and, at the same time, re-engaging the differential gearing clutch 67.

The operator then proceeds in the same manner to draw each run or side of the map until it is completed, following which the completed map is removed from the machine by tilting the backup rollers and stylus sufficiently to release the map or, preferably, by first locking the arm assembly 25 in an upward position by adjustment of thumb screw 29.

If it is desired to reinsert the same map in the machine for the purpose of drawing another area in its proper position on the previously prepared map, the operator proceeds as follows. First, bearing subassembly 18 is set in a proper position to draw a selected line of the existing map. The map is then placed upon the table and the stylus is removed allowing the operator to sight through the opening left by the absent stylus thereby to position the beginning of the run to draw the selected side of the existing map directly under the center of the opening for the stylus. The next operation is to move slider 170 along arm 25 until its vertically disposed pointer 171 directly overlies the end of the run having the bearing for which dial 18 has been set. The beginning of the run will now be centered beneath the stylus and the end of the run will be centered directly beneath pointer 171 with the center line of arm 30 directly over and parallel to the selected line of the existing map. The operator can now proceed to draw a second map plot with the knowledge that it will be accurately located and oriented with respect to the previously drawn map.

It should also be pointed out that true north can always be placed upon the map and in a very accurate and precise manner by adjusting the bearing scale assembly 18 until the dividing line between NE and NW on quadrant indicator 97 is directly opposite arrow 98 (FIGURE 3). An arrow 175 may then be placed upon the map parallel to arm 30 to indicate true north.

While the particular precision mapping machine herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A mapping machine for making a scale map of a plot of ground using survey data, said machine having a rigid main frame provided with wide-area supporting means for paper and the like, cooperating paper feeding and gripping means arranged to grip and move a sheet of paper in any direction in the plane thereof and located partially on either side of said supporting means, stylus means bearing against one side of said sheet paper, manually operable means for driving said paper feeding and gripping means and effective to rotate said sheet paper in the plane thereof about the point of contact of said stylus in any angular amount and for thereafter advancing said sheet a measured distance in a straight line past said stylus, and means normally occupying one of two alternate stable positons for use in selectively locking said paper against one of said modes of movement while permitting movement only in the other of said modes.

2. A precision mapping machine operable to draw a map to scale from survey data, said machine comprising means for supporting a sheet of material on which the map is to be drawn, stationary means for supporting a stylus against said sheet, said sheet supporting means including a first pair of backup idler rollers bearing against one face of said sheet and a second pair of drive rollers bearing against the opposite face of said sheet in opposition to said first pair of rollers, the rollers of said pairs being mounted on parallel axes and spaced equidistantly to either side of said stylus, first and second axially aligned shafts fixed to respective ones of said drive rollers, a single differential gear assembly interconnecting said first and second shafts including a bevel gear fixed to each shaft and bracket means journaled in part on each shaft and rotatably supporting a bevel gear in mesh with said first mentioned bevel gears, 360 degree precision bearing measuring means coupled to said first shaft, manual means for rotating said first and second shafts in opposite directions to rotate said sheet material about the axis of said stylus to a precise bearing as read on bearing measuring means and including means for holding the bracket means of said single differential gear assembly stationary.

3. The combination defined in claim 2 characterized in that said bearing measuring means includes vernier scale means and main arc measuring means rotatably coupled one to said first shaft and one to said second shaft and cooperating to measure the rotation of said sheet material to a new bearing with a precision of approximately one minute of arc.

4. The combination defined in claim 3 characterized in that said bearing measuring means includes a plurality of annular scale means arranged concentrically and each 360 degree annular scale being divided to indicate bearing readings in either of two diametrically opposed compass quadrants.

5. The combination defined in claim 4 characterized in the provision of indicator means coupled to said bearing measuring means including means for indicating the particular compass quadrant in use at any given time.

6. The combination defined in claim 2 characterized in that one of the scale means of said bearing measuring means includes annular ring means having its rim graduated into two sets of 90-degree scales each readable by distinctive indicia arranged both clockwise and counterclockwise and each representing bearings in either of two diametrically opposed compass quadrants.

7. A mapping machine as defined in claim 2 characterized in the provision of means for measuring the length of straight lines to be impressed on the paper by said stylus and including means operable independently of said first and second shafts for quickly and accurately restoring said measuring means to its zero reading after completion of a given straight run.

8. A mapping machine as defined in claim 7 characterized in that said straight line measuring means includes manually operable means connected with said paper feeding means to advance the paper in a straight line and visually indicating at all times the exact length of the straight line impression being made on the paper as the paper is being manually advanced.

9. A precision terrain mapping machine operable to draw a plot map to scale from plot survey data, said machine having a marking stylus, first and second pairs of rollers mounted for rotation on parallel axes and cooperating to support a plaque of sheet material firmly therebetween and in contact with said stylus, said first pair forming backup rollers for said second pair, said second pair of rollers being fixed respectively to first and second shafts and interconnected by three gears including one fixed to each of said shafts and one in mesh with each of said first mentioned gears and journaled in a bracket means rotatable about the axes of said shafts, clutch means for selectively coupling said first and second shafts together and, when disengaged, permitting said shafts to rotate independently of one another, first manually operable means for rotating said bracket means when said clutch means is closed thereby to drive said second pair of rollers in unison to advance said sheet material in a straight line along a predetermined course past said marking stylus, said manually operable means including means for holding said bracket means stationary when an operating force is not being applied thereto, and second manually operable means coupled to said first shaft and operable when said clutch means is disengaged to drive said second rollers at equal rates in opposite directions to adjust said sheet material to a desired different bearing about the axis of said marking stylus.

10. A mapping machine as defined in claim 9 characterized in that said second pair of rollers have thin peripheral rim edges provided with a small radius crown.

11. A mapping machine as defined in claim 10 characterized in that said first pair of idler rollers have relatively wide peripheral rim edges provided with a relatively long radius crown.

12. A mapping machine as defined in claim 9 characterized in the provision of a backup roller on the axis and of the same diameter as and midway between said second pair of rollers and bearing against said plaque directly opposite said stylus.

13. The combination defined in claim 9 characterized in the provision of distance measuring scale means indicating when said sheet material has been advanced along a selected bearing for a predetermined distance and including means for resetting said distance measuring scale means to zero before starting to plot each straight course on said sheet material.

14. The combination defined in claim 13 characterized in the provision of means for operating said clutch means between the engaged and disengaged portions thereof including means for disconnecting said distance measuring scale means from said second pair of rollers and for conditioning the same for rotation in differential unison.

15. The combination defined in claim 9 characterized in the provision of a pair of cooperating precision bearing measuring means operatively connected one to each of said first and second shafts and enabling the operator to determine with preciseness when said sheet material has been rotated about the axis of said marking means by a predetermined angle.

16. A mapping machine as defined in claim 9 characterized in the provision of means for placing indicia on said sheet of paper indicating the direction of true north and accurately related to the bearings represented by the scale map made on said paper by said machine.

References Cited by the Examiner
UNITED STATES PATENTS

| | | | |
|---|---|---|---|
| 1,123,795 | 1/1915 | Pollen et al. | 346—8 |
| 1,200,702 | 1/1916 | Boddie | 346—8 X |

RICHARD B. WILKINSON, *Primary Examiner.*

LEO SMILOW, JOSEPH W. HARTARY, *Examiners.*